United States Statutory Invention Registration [19]

[11] Reg. Number: H834

Boring [43] Published: Nov. 6, 1990

[54] AQUEOUS PROCESS FOR REDUCING URANIUM OXIDE TO URANIUM METAL

[75] Inventor: Christopher P. Boring, Clinton, Tenn.

[73] Assignee: The United States of America as represented by the United States Department of Energy, Washington, D.C.

[21] Appl. No.: 491,027

[22] Filed: Mar. 8, 1990

[51] Int. Cl.[5] ..... C22B 60/02

[52] U.S. Cl. ..... 75/399; 75/84.1 R; 75/57

[58] Field of Search ..... 75/84.1 R, 84.1 A, 57

[56] References Cited

U.S. PATENT DOCUMENTS

| | | | |
|---|---|---|---|
| 3,979,205 | 9/1976 | Wanzenberg | 75/10.19 |
| 4,534,792 | 8/1985 | Elliot . | |
| 4,717,420 | 1/1988 | Duerksen | 75/84.1 R |

*Primary Examiner*—Stephen J. Lechert, Jr.
*Assistant Examiner*—Nina Bhat
*Attorney, Agent, or Firm*—Katherine P. Lovingood; Stephen D. Hamel; William R. Moser

[57] ABSTRACT

A process for converting uranium oxide to uranium metal wherein uranium oxide is reduced with a reducing agent, and the uranium metal product is recovered by dissolving the excess reducing agent and by-products in a dissolution aid.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AQUEOUS PROCESS FOR REDUCING URANIUM OXIDE TO URANIUM METAL

This invention relates to a process for reducing uranium oxide to uranium metal and more particularly to a process that uses a dissolution aid to dissolve excess reducing agent and by-products resulting in a simpler more efficient process than those previously used. It was developed pursuant to a contract with the United States Department of Energy.

BACKGROUND OF THE INVENTION

Uranium oxide is a by-product of the nuclear industry. A major drawback of nucear reactors used for energy production is the amount of spent fuel that results and must be disposed of.

Reprocessing methods include one used at Oak Ridge National Laboratory referred to as the "bomb reduction" method. It involves a laborious sequence of operations of hydrofluorination of the oxide to the fluoride and reduction of the fluoride to metal with calcium and magnesium. The separation of the uranium metal from the reaction products is expensive and disposal of these reaction products in accordance with governmental regulations is difficult and costly. In addition, the hydrofluorination process presents significant safety hazards.

Another similar process first converts uranium oxide to uranium hydride, which, after magnetically separating from the other reaction products, is then converted to uranium metal. The separation process is determining for the uranium metal yield, limiting the results to insignificant amounts.

Other processes utilize molten salt solutions. In one, uranium oxide is reduced to uranium metal with magnesium in a solution of magnesium and halide salts. In another, a process similar to a solvent extraction is used where the solvent is a molten alloy and the extractant is a mixture of molten salts. Products of these molten salt processes must be separated from the excess starting material and by-products in the molten state. Both processes are carried out in a nonaqueous environment.

In view of the limited yields, the unsafe conditions, and the difficulty of separating the products when using the presently known processes, it is necessary to find an alternative process that will allow easier isolation of products using less hazardous reagents.

SUMMARY OF THE INVENTION

In view of the above needs, it is an object of this invention to provide an aqueous process for converting uranium oxide into uranium metal.

It is another object of this invention to provide a process for converting uranium oxide to uranium metal that will result in good yields.

An additional object of this invention is to provide a process to convert uranium oxide to uranium metal wherein the separation of the product from the by-products and excess starting material is done in an aqueous phase at room temperature.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the process of this invention may comprise, first, in an inert atmosphere, combining uranium oxide and an excess of reducing agent, either calcium or magnesium, at a temperature of about 950° to 1050° C. Second, add a solution of either ammonium nitrate or nitric acid that has a concentration of from 4.5 to 6 moles per liter, which acts as a dissolution aid for the excess reducing agent and reaction by-products. Third, separate the aqueous phase from the solid uranium metal phase. This process provides a safe and simple method for the conversion of uranium oxide to uranium metal.

DETAILED DESCRIPTION OF THE PREFERRED EMBODIMENT

To practice this invention uranium oxide is loaded into a refractory crucible with a slight excess of either calcium or magnesium as a reducing agent. The loaded crucible is heated in an inert atmosphere to a temperature of about 1000° C., then held at these conditions for about 4 hours for complete reduction of uranium oxide to uranium metal. The loaded crucible is cooled to ambient temperature in the inert atmosphere of the furnace. At this point the uranium metal cannot be separated from the by-products and excess reducing agent since they are all in solid form; therefore, it is necessary to first dissolve the latter in a dissolution aid thereby leaving the uranium metal as a solid. The products of the reaction are covered with a dissolution aid comprising an aqueous solution of about 4.5 to 6.0 moles per liter of ammonium nitrate or nitric acid. The dissolution aid is used to lower the pH of the aqueous solution to about 9.5. The aqueous phase, containing the by-products, is removed from the solids by filtration, then the solids are rinsed. The aqueous solution of the filtrate and rinse is filtered for complete removal of uranium metal.

EXAMPLE

Uranium dioxide weighing 54.0 grams, representing 47.6 grams of uranium, was loaded into a crucible of magnesium oxide. The reducing agent calcium weighing 20 grams was mixed with the sample of uranium dioxide in the crucible. The loaded crucible was placed in a furnace in an argon atmosphere and heated to a temperature of 1000° C. The furnace was maintained at the temperature of 1000° C. for 4 hours to complete the reduction of the uranium dioxide to uranium metal. The crucible was then cooled to room temperature and removed to a glove box while maintaining the argon atmosphere. An aqueous solution containing 4.5 moles per liter of ammonium nitrate and having a pH of 7.0 was prepared for dissolving the excess reducing agent of calcium and the reaction by-product of calcium oxide. An aliquot of 275 milliliters of the prepared aqueous solution was mixed with the contents of the crucible which was then transferred to a filtering apparatus consisting of 0.45-micron grade membrane filter in a millipore hazardous waste filtration system. The crucible and filtered solids were rinsed with the dissolution aid and the resulting filtrate was refiltered. The filtered solids were removed from the filter paper and dried under a vacuum. The solids were melted in a graphic resistance furnace at a temperature of 1400° C. in an argon atmosphere for consolidation. Analysis of the product indicated that the used aqueous solution contained less than 1 ppb and the consolidated solids contained 99.7 wt % uranium metal.

The results of this process demonstrate an improvement over prior processes. Not only is the process simple and the reactants safe to handle, the uranium content of the discard stream of the claimed invention is three orders of magnitude less than in the "bomb reduction" process currently being used at Oak Ridge National Laboratory. The chemically hazardous and potentially explosive materials such as fluorines and molten salts are not needed. The amount of uranium lost in the subject process is so small that the waste stream can be placed in the low-level radiation classification. The chemical reactions are achieved at relatively low temperatures. Also, the process is compatible with the nitrate process for preparation of uranium metal used at Oak Ridge National Laboratory.

I claim:

1. A process for converting uranium oxide to uranium metal comprising:

in an inert atmosphere, combining uranium oxide and an excess of a reducing agent selected from the group consisting of calcium and magnesium to form a mixture;

heating said mixture to a temperature of about 950 to 1050° C. for about 4 hours;

cooling said mixture to room temperature;

adding an aqueous solution of a dissolution aid having a concentration of from about 4.5 to 6 moles per liter, said dissolution aid being selected from the group consisting of ammonium nitrate and nitric acid, said addition being sufficient to lower the pH of said mixture to about 9.5 and to dissolve excess reducing agent and by-products in an aqueous phase; and separating said aqueous phase from the solid uranium metal product.

* * * * *